Sept. 23, 1924.
J. M. RODRIGUEZ
ELECTRIC MOTOR
Filed Aug. 29, 1921
1,509,813
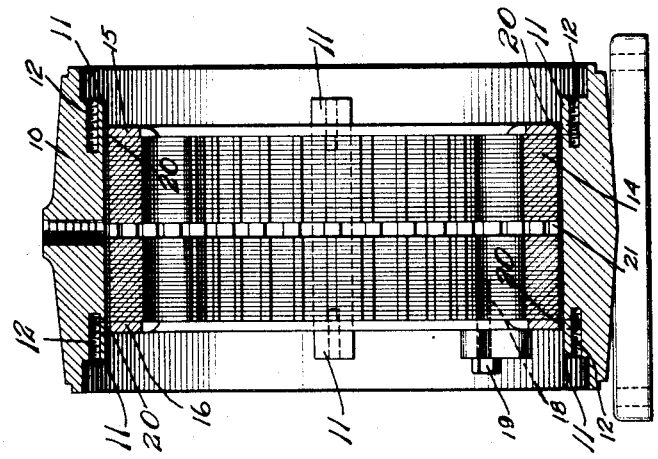
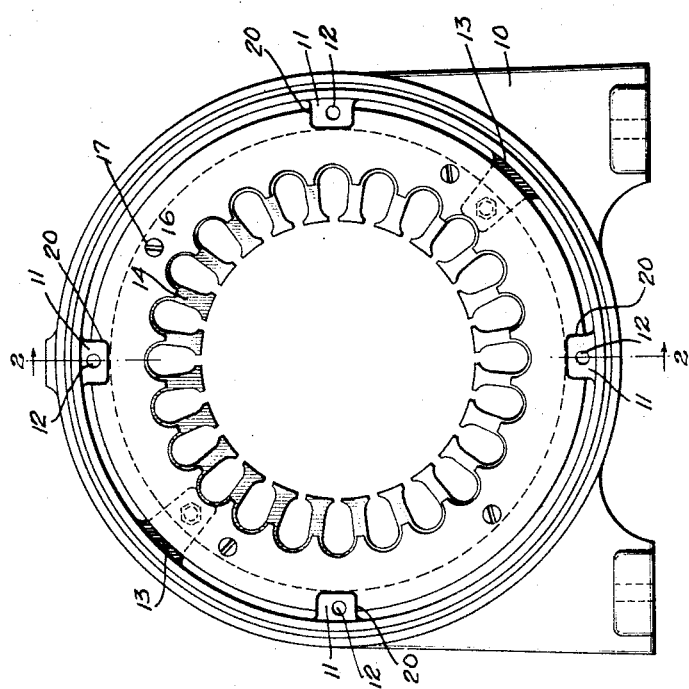
WITNESSES
INVENTOR
Joseph Manasco Rodriguez.
BY
ATTORNEYS Patented Sept. 23, 1924.

1,509,813

UNITED STATES PATENT OFFICE.

JOSEPH MANASCO RODRIGUEZ, OF BROOKLYN, NEW YORK.

ELECTRIC MOTOR.

Application filed August 29, 1921. Serial No. 496,247.

*To all whom it may concern:*

Be it known that I, JOSEPH MANASCO RODRIGUEZ, a citizen of the United States, and a resident of the city of New York, borough of Brooklyn, in the county of Kings and State of New York, have invented a new and Improved Electric Motor, of which the following is a full, clear, and exact description.

This invention relates to the construction of electric motors.

The general object of the invention is to provide a motor, the stator of which may be removed and replaced without moving the motor from the position in which it may have been mounted.

This object is accomplished by building the motor casing and the stator separate and providing means in conjunction with each so that the stator may be removably mounted in the casing.

This and other objects of the invention will be more clearly understood from the following detailed description and accompanying drawings.

Figure 1 is a side elevation showing the stator mounted in the motor casing;

Figure 2 is a cross section along the line 2—2, Figure 1.

Referring to the above-mentioned figures, a motor casing 10 which may be of any desired design is shown. Cast integral with this motor casing is a plurality of guides 11. Threaded openings 12 are provided in the ends of these guides. These openings serve as a means for attaching the end plates of the motor to the body of the motor casing. Lugs 13 are also cast integral with the motor casing and these lugs have openings extending therethrough so that studs may be protected therethrough and screwed into the stator 14 to hold it in position.

The stator 14 is built of laminations of any well known design. These laminations are clamped together by means of plates 15 and 16 connected by bolts 17 extending through the laminations. The plates 15 and 16 are greater in diameter than the laminations and thus present rims which extend beyond the laminations. Grooves or notches 20 are cut in the rims presented by the plates 15 and 16. These notches 20 are shaped and spaced for receiving the guides 11 formed in the motor casing. In positioning the stator in the casing the notches or grooves 20 are alined with the guides 11 and then the stator is projected bodily into the casing. The guides 11 serve as tracks on which the plates 15 and 16 slide.

Studs 19 are projected through the openings formed in the lugs 13 and engage in threaded openings 18 in the stator. Thus the stator is rigidly attached to lugs which are formed integral with the casing. This provides a means for rigidly supporting the stator in position.

A ventilating means 21 is provided in conjunction with the stator and co-operates with a ventilating duct provided in the motor casing.

The advantage is that in case of damage to the stator windings the stator may be removed for repairs and a new stator placed in position without removing the motor from its bed. In the case of breakdowns in factories this is a decided advantage since the machinery can be quickly set in operation thus saving a great loss of time as would be necessitated if the motor had to be removed from its bed and then replaced. The replacing of the motor requires a considerable amount of time for re-leveling and alining.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

What is claimed is:

1. A motor, comprising a casing having longitudinal guides therein, a stator for removably mounting in the casing including a plurality of laminations clamped between plates which extend beyond the laminations presenting rims, said rims having grooves or slots cut therein for receiving the longitudinal casing guides, lugs provided on the motor casing, and means for attaching the stator to said lugs, fixing it in position in the casing.

2. In a motor, including a motor casing having a plurality of longitudinal guides therein, a stator for mounting in the casing, comprising a plurality of laminations clamped between plates, said plates extending beyond the laminations presenting rims in which slots are cut, said slots being spaced about the rims for receiving the casing guides, and means for fixing the stator to the casing.

3. In a motor including a casing having guiding means provided therein and extending longitudinally of it, a stator for removably mounting in said casing, comprising a plurality of laminations clamped between plates, said plates extending beyond the laminations and being provided with means for slidably engaging the guiding means provided in the casing.

4. A motor, comprising a casing having guiding means extending longitudinally thereof, a stator for mounting in said casing including a plurality of laminations clamped between plates, said plates extending beyond the laminations presenting rims provided with means for slidably engaging the guiding means provided in the casing, and means for fixing the stator in position in the casing.

5. A motor, comprising a casing, a plurality of longitudinal guides spaced about the inner wall of said casing, a stator for mounting in the casing including a plurality of laminations clamped between plates extending beyond the laminations presenting rims, said rims having slots cut therein for fitting over the guides to slidably mount the stator thereon, lugs carried by the casing, and means for attaching the stator to said lugs.

JOSEPH MANASCO RODRIGUEZ.